United States Patent [19]

Marks

[11] Patent Number: 4,585,141
[45] Date of Patent: Apr. 29, 1986

[54] LOCKING SYSTEM FOR FLOOD COVER

[75] Inventor: Robert J. Marks, Carpentersville, Ill.

[73] Assignee: Reliance Electric Company, Cleveland, Ohio

[21] Appl. No.: 687,057

[22] Filed: Dec. 28, 1984

[51] Int. Cl.[4] .............................................. H02G 9/02
[52] U.S. Cl. ..................................... 220/326; 220/18; 220/323; 220/346; 174/38
[58] Field of Search ................. 220/326, 323, 346, 18, 220/256, 287, 306, 348; 174/38; 138/96 R

[56] References Cited

U.S. PATENT DOCUMENTS

| 565,013 | 8/1896 | Moodie | 220/18 X |
|---|---|---|---|
| 1,183,490 | 5/1916 | Pollgreen | 220/346 X |
| 1,320,543 | 11/1919 | Gill | 220/326 |
| 1,433,912 | 10/1922 | Rosenlof | 220/326 |
| 2,256,257 | 9/1941 | Dukehart, Jr. | 220/346 X |
| 2,724,968 | 11/1955 | Greene | 220/18 X |
| 3,343,712 | 9/1967 | Lentz | 220/323 X |
| 3,928,713 | 12/1975 | Davis | 174/38 |
| 4,475,571 | 10/1984 | Houston, Jr. et al. | 220/326 X |

OTHER PUBLICATIONS

TI221, Issue 1, 2/76.
Maintenance and Rehabilitation Systems, 3M 1981.
Coil Sales and Manufacturing Co., 'B' Flood/Security Control Cover, Series 375, Issue C 6/77.

Primary Examiner—Steven M. Pollard
Attorney, Agent, or Firm—Michael M. Rickin

[57] ABSTRACT

A locking system for a flood cover having a rigid mouth. The system has a pair of oppositely opposed locking mechanisms. Each leg mechanism includes a stiff leg portion whose length is greater than the air space that would result if the closure over which the cover is to be placed were centered in the cover. A spring holds the stiff leg essentially parallel to the mouth before the cover is placed over the closure. As the cover is placed over the closure the stiff leg pivots and the tension of the spring increases.

14 Claims, 6 Drawing Figures

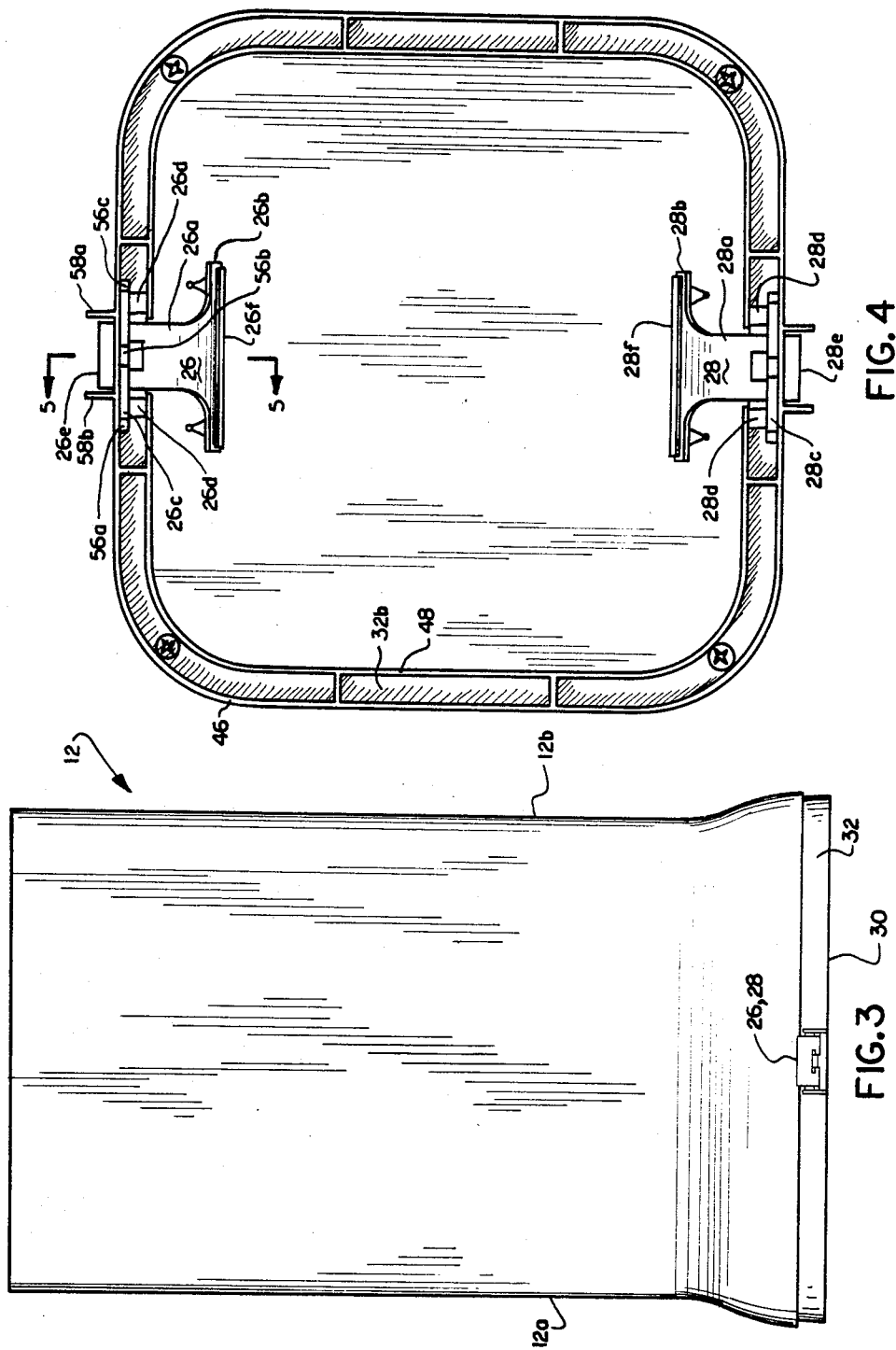

LOCKING SYSTEM FOR FLOOD COVER

BACKGROUND OF THE INVENTION

1. Field of the Invention

This invention relates to flood covers and more particularly to a locking system for use in conjunction therewith.

2. Description of the Prior Art

In the telecommunications industry, pedestal closures are used to provide a place where cable pairs may be interconnected to each other. Such interconnections are made at a connector block which is mounted inside the closure. The connector block includes a number of terminals and the pairs of wires in the cable are stripped of their insulation and connected to the terminals. It is quite important that moisture be prevented from reaching the exposed portions of the cable at the terminals.

In some instances it may be required to locate the pedestal closures in areas, such as the Gulf Coast of the U.S., which are subject to periodic flooding. It is, therefore, necessary to provide a cover for the pedestal closure which will prevent the flood waters from reaching the terminals of the connector block. This flood cover is a separate cover because normal conditions require internal ventilation of the pedestal. When flooding is expected the cover is placed over the regular cover of the pedestal closure. In the presence of flood waters a volume of air is trapped inside the flood cover due to the bell jar effect. This trapped air prevents the water from rising inside the flood cover. By appropriate sizing of this volume of air and by properly selecting the position of the mouth of the flood cover in relation to the connector block the flood waters may be prevented from reaching the block's terminals.

It is, however, necessary that the mouth of the flood cover be kept fixed at the selected position. Keeping the position of the mouth fixed ensures that the increased pressure on the trapped air column as flooding occurs will not try to "float" the flood cover, to relieve the increase in internal air pressure. If the mouth position were to rise, then the flood waters could rise to the level of the connector block terminals causing a service outage. Maintaining the mouth in the desired fixed position requires that the flood cover be locked to the outer surface of the pedestal cover.

Some typical techniques used to lock the flood cover to the pedestal include those which require a clamping bracket to be positioned around the pedestal column. The flood cover is then placed over the pedestal and is fastened to the clamping bracket by a bolting means or a bayonet-locking means.

Another technique involves the placing of screws at the bottom of the flood cover. The screws are then screwed radially toward the closure with opposing screws providing the locking action. This technique is not very efficient and quite often the flood cover uses a chain as an additional restraining device to prevent the cover from floating away.

A screw-clamp locking technique requires positive location of the clamping means on the pedestal. This has the potential to mar the pedestal's finish and may require additional surface preparation prior to installation, in anticipation of the use of a flood cover on that specific closure. In the presence of flood waters such marring can lead to accelerated corrosion of the pedestal. Even if the pedestal is of the non-metallic type the pressure of the fasteners, due to their geometrical shape and small contact area, can lead to indenting or fracture of the closure. Finally, if the fasteners are insufficiently tightened the position of the clamp may change, when in the presence of flood waters the flood cover tries to rise as a result of the compression of the air volume trapped inside of it.

It is therefore desirable that there be provided a flood cover which does not mar the finish of a metallic closure or indent or fracture a closure of the non-metallic type in the presence of flood waters and that it may be functionally installed on an in-place pedestal without subsequent alteration of the pedestal. It is further desirable that the flood cover be relatively easy to install and remove. It is also desirable that the cover be such that it need not be centered over the closure in order to keep the flood waters from rising to the level of the connector block.

SUMMARY OF THE INVENTION

A locking system for use in a flood cover which has a rigid mouth. The cover is adopted to be placed over a vertically standing equipment closure. The system has two locking mechanisms.

Each mechanism has a surface contacting means which is brought into contact with the outside surface of the closure when the cover is placed over the closure. The mechanism also has a stiff leg member, one end of which is connected to the surface contacting means such that that means projects upwardly therefrom at an angle. The length of the stiff leg member is greater than the air space which would result between the closure's outside surface and the cover if the cover were placed over the closure so that the closure was in the center of the rigid mouth.

The other end of the stiff leg member is connected to a pivot means. The locking mechanism also includes a spring means which is connected to the stiff leg member such that it holds that member essentially parallel to the opening of the rigid mouth when the cover is not over the closure. As the cover is placed over the closure the surface contacting means comes in contact therewith to cause the stiff leg member to pivot and the tension of the spring means increases.

DESCRIPTION OF THE DRAWING

FIG. 3 is a side view of a flexible flood cover which uses the locking mechanisms of the present invention.

FIG. 4 is a bottom view of the flood cover of FIG. 3 looking into the cover's mouth.

DESCRIPTION OF THE PREFERRED EMBODIMENT

Figure 1:
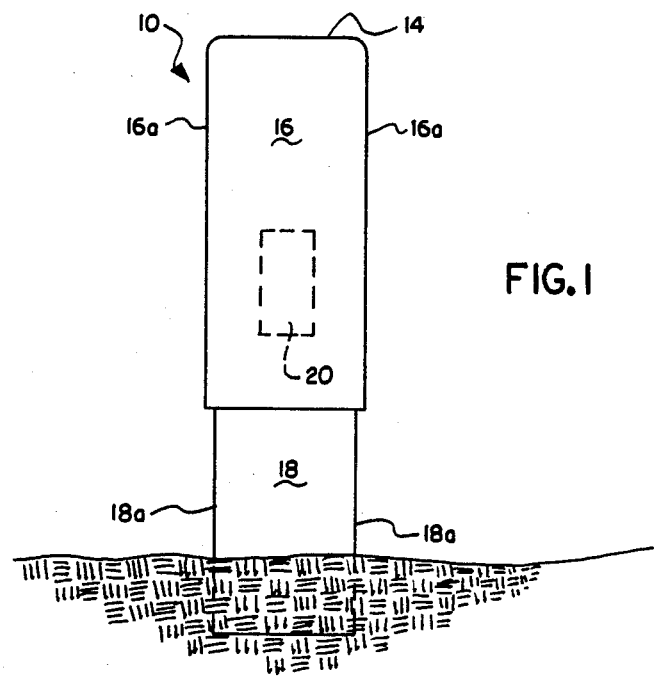
FIG. 1 shows a typical partially buried pedestal closure.

Referring now to the drawing figures there is shown a typical pedestal closure 10 and a flood cover 12 which embodies the present invention. Pedestal closure 10 (see FIG. 1) may be any one of a number of types well known in the art, as for example that shown in U.S. Pat. No. 4,058,670 which issued on Nov. 15, 1977. Pedestal closure 10 typically has a top surface 14, upper cover 16 and lower cover 18. The upper and lower cover are essentially equal in width. A connector block 20 which may be any one of the types well known in the art is typically mounted in the upper portion of the closure 10. Closure 10 is typically installed with part of its lower cover 18 buried below ground level.

Figure 2:
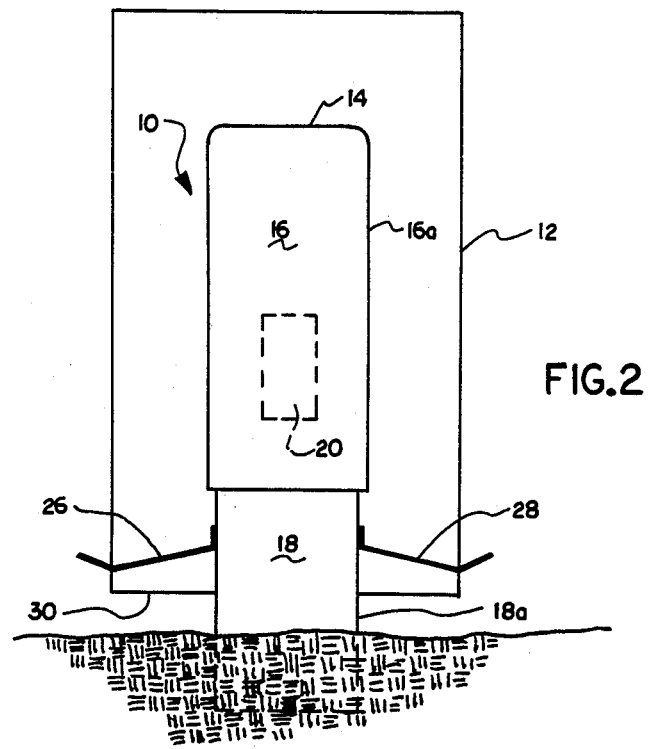
FIG. 2 is a cross-section of the flood cover of the present invention as installed over the closure of FIG. 1.

Flood cover 12 includes locking mechanisms 26, 28. These mechanisms are shown in simplified form in FIG. 2. Locking mechanisms 26, 28 are brought into contact with the outer surface of lower cover 18 when the flood cover is in its installed position. As will be described in more detail hereinafter these locking mechanisms allow for the cover to be kept at the selected installation position in the presence of floodwaters.

Flood cover 12 may be embodied in either a flexible or rigid form. When the flood cover is embodied in a rigid form it can be molded out of any suitable material such as polyvinyl chloride or polyethylene, or fabricated from sheet or drawn metal, as long as the finished shape provides a bell type shape with air-tight joints. When the flood cover is embodied in the flexible form, a suitable material such as polyethylene sheeting, flexible vinyl film, or polyvinyl chloride cap stock can be used for the cover which allows collapsing for storage. In either form the cover may be either one piece or have seams, as long as they are reasonably airtight.

When the flood cover is embodied in either form it is necessary that the periphery of the mouth 30 of the cover be a rigid member. This rigidity of mouth 30 ensures that locking mechanisms 26, 28 remain fixed when brought into contact with the outer surface of lower cover 18. When the flood cover is embodied in the flexible form this desired rigidity of mouth 30 is obtained by the use of clamping ring assembly 32. For purposes of description it will be assumed hereinafter that cover 12 is embodied in the flexible form.

Referring now specifically to FIG. 4 there is shown a detailed view of opposed locking mechanisms 26, 28 and the clamping ring assembly 32 in which they are mounted. As shown most clearly in FIGS. 3 and 5 the opposed locking mechanisms and the clamping ring combination are attached to the flood cover at its mouth 30. It should be appreciated that at least one pair of opposed locking mechanisms are necessary, although multiple pairs may be used.

Each of the locking mechanisms 26, 28 consists of a stiff rigid leg member 26a, 28a; a presser foot 26b, 28b; a pivoting pin 26c, 28c; a spring member 26d, 28d; and a release tab 26e, 28e. As presently embodied, the stiff rigid leg member, presser foot, pivoting pin, spring member and release tab are manufactured as an integral assembly out of any suitable material.

A friction pad or some other engagement means such as a toothed surface 26f, 28f is fastened to each presser foot 26b, 28b. It is the pad which comes in contact with the closure 10 when the flood cover is put in place. This contacting of the pad with the closure provides a non-movable pivot joint. It should be appreciated that the presser foot may be connected to the leg member in the form of a constrained flexible joint. This type of joint allows the presser foot to remain parallel to the outside surface of the closure even in the presence of movement of the stiff leg member. Such movement could arise as a result of wave motion in the standing water. As both of opposed locking mechanisms 26, 28 are identical in construction, only one will be described in more detail hereinafter.

The stiff leg member 26a pivots on point 26c. Spring member 26d is in unitary relationship with leg member 26a and is at some acute angle with respect to it, although the spring member could also be a separate component such as a torsion spring. That angle is typically in the order of 60°. As member 26a pivots on pin 26c, spring member 26d would also so pivot unless otherwise constrained. The motion of member 26d is, however, restrained at its tip by a suitably arranged spring stop 60 in clamping ring assembly 32. Therefore, as leg member 26a rotates spring member 26d flexes to provide horizontal and vertical forces at pad 26f.

Prior to installation of the cover 12 over closure 10 it is desirable that stiff leg member 26a be constrained to be essentially parallel to the mouth 30. Constrained spring member 26d therefore functions as a cantilever beam or semi-elliptical spring so as to pre-load stiff leg member 26a before cover 12 is installed. By limiting the motion of member 26d in the manner described above, the loading provided by member 26d is such that the stiff leg member 26a is essentially parallel to mouth 30 before cover 12 is installed.

As the cover is placed over the closure the presser foot 26b in the form of friction pad 26f first contacts the outside surface 16a of upper cover 16. This contact occurs because the length of stiff leg member 26a is greater than the airspace distance between the cover and the pedestal. This causes leg member 26a to pivot upwards. The length of the stiff leg member may be a fixed dimension for each application, or may be adjustable in length by various means, such as being two-pieced with interlocking steps or mechanical fasteners. Spring member 26d is constrained in its travel by the notch in ring 32 and the upward rotation of member 26a causes the spring member to flex thereby creating a force at the presser foot 26b. The surface area of the presser foot should be such that there is no deformation of the outside of the closure. When the flood cover is located at the desired position, the presser foot 26b and the friction pad 26f contact the outside surface 18a of lower cover 18 and the stiff leg member 26a is at some positive angle inside the cover which is greater that 0°. This angle is typically in the order of 10° to 15° but may be greater depending on the size of the pedestal.

Stiff rigid leg member 26a is of a length which is dimensionally greater than the physical distance from the outer surface 16a, 18a of upper or lower cover 16, 18, respectively, to the inner surface 12a of cover 12. In other words, the length of member 26a is greater than the airspace between surfaces 12a and 16a or 18a. I have found that this dimensional relationship is critical to the proper operation of my invention.

With flood cover 12 in place, rising water will seal the bottom opening of the air column trapped inside the cover. As the water continues to rise the pressure on the trapped air column would continue to increase. This buoyancy force on the cover 12 would therefore try to raise the cover in order to reduce this pressure to zero. The combination of the buoyancy force and the force exerted by spring member 26d attempts to pivot stiff leg member 26a back to an angle of zero degrees. The length of member 26a is greater than the airspace between surfaces 12a and 16a. This combination of forces therefore wedges stiff leg member 26a which causes cover 12 to be retained tighter. Therefore in the presence of rising water the locking mechanism 26, 28 of my invention counteracts the increased pressure to keep the flood cover at the position that it was installed at.

It should, however, be appreciated that it is the rigidity of mouth 30 provided by clamping ring assembly 32 which ensures that member 26a will not pivot at either end under the increased pressures of the rising water and that the frictional force at the pad 26f is sufficient to prevent sliding motion at the contact patch of the friction pad with the pedestal surface. It should also be appreciated that the cover need not be installed such that it is centered over the pedestal in order for it to remain at its installed position in the presence of rising flood waters. The only requirement is that the cover be installed such that the stiff leg members 26a, 28a are both at some positive angle. It is not necessary for the angle of member 26a to be the same as the angle of member 28a. Should the cover be moved horizontally after installation, as for example by the impact of floating debris, it will remain in its installed position provided that both stiff leg members are still at some angle greater than zero degrees. Even if the cover shifts horizontally a distance such that one of the stiff leg members no longer contacts the pedestal, the cover will float to a new higher locked position provided it is not prevented from doing so by the debris.

Release tab 26e provides a means by which the flood cover 12 can be removed from closure 10 after it has been installed. Tab 26e is at an obtuse angle, in the order of 135°, with respect to rigid member 26a. Tab 26e projects through clamping ring 32 and appears on the outside surface 12b of cover 12. In order to release the cover once it has been installed, it is necessary that a downward force be exerted on tab 26e. As tab 26e is connected through pivot point 26c to stiff member 26a, the downward force exerted on tab 26e causes stiff member 26a and therefore presser foot 26b to be rotated towards the vertical. This rotation increases the load on spring member 26d, as the attempt by that member to also rotate is constrained by clamping ring 32. Therefore, in response to the downward force on tab 26e, presser foot 26d rotates away from closure 10.

It should be appreciated that as cover 12 also includes locking mechanism 28 that a similar downward force must also be simultaneouslyl exerted on release tab 28e in order that cover 12 can be removed from the closure. It should also be appreciated that the downward forces must be exerted continuously on tabs 26e, 28e during the time the cover is being vertically raised so that it can be removed from the closure. Of course, means can be provided to lock the release tabs in place when the cover is being raised. This locking means will more than likely be necessary if the cover has more than one pair of locking mechanisms. As the downward force on the release tabs increases the load on the corresponding spring member, the removal of that force would allow the spring member to relieve its load by causing the associated presser foot to rotate towards the horizontal. The foot would then once again come in contact with the outside surface of the closure. The cover could no longer be vertically raised and mouth 30 would then be located at a vertical height which would be higher than its height when the cover is completely installed.

Figure 5:
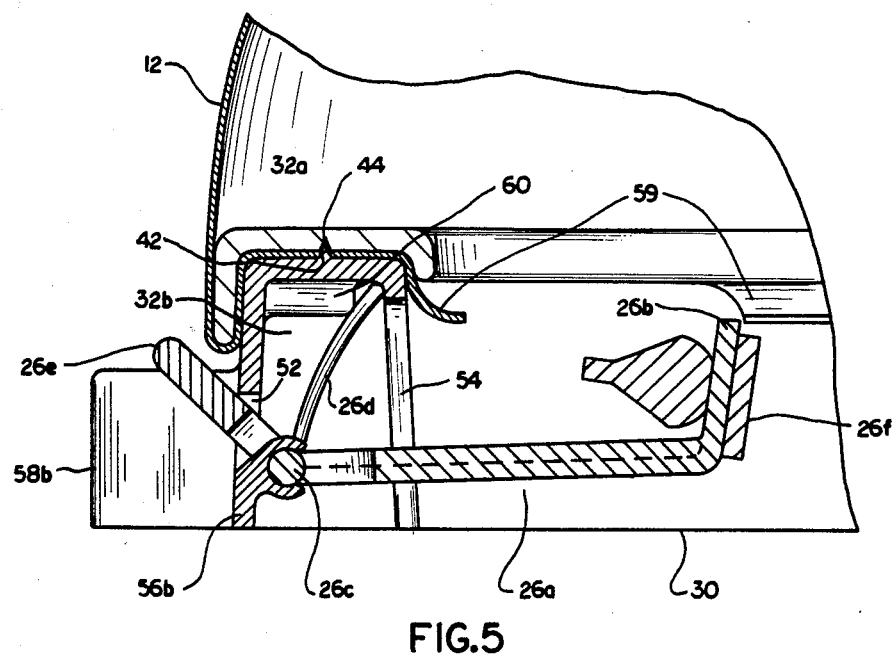
FIG. 5 is a cross-section through one side of the clamping ring assembly shown in FIG. 4.

As described above for the flexible flood cover the desired rigidity of mouth 30 is obtained by the use a of clamping ring assembly 32. As most clearly shown in FIG. 5, ring assembly 32 is the combination of an upper ring 32a and a lower ring 32b. The desired rigidity of mouth 30 is obtained by clamping the bottom of flexible cover 12 between the upper and lower rings 32a, 32b. More particularly, as shown in FIG. 5 the top surface of the top edge 50 of lower ring 32b has thereon a hill-like protrusion or contour 42 which is convoluted at some angles which are typically in the order of 60°. The bottom of upper ring 32a has therein a pocket 44 which corresponds to hill contour 42. The bottom of flexible cover 12 is clamped between positive hill contour 42 and its pocket 44. Therefore clamping ring assembly 32 provides a convoluted or nonlinear path to enhance the clamping of the bottom of the flexible cover by the assembly.

In assembling cover 12 and rings 32a, 32b the corners of the bottom of the cover are first cut away so as to form in effect four shirttails 59 to compensate for peripheral dimensional differences which could cause puckering at the corners on assembly and could diminish the force with which the assembly clamps. As shown in FIG. 5, the shirttails 59 are then placed such that they are clamped between hill contour 42 and pocket 44 with the upper ring 32a being inside the cover. Therefore when finally assembled the cover 12 is outside of upper ring 32a and the outer edge 46 of lower ring 32b is exposed.

Figure 5A:
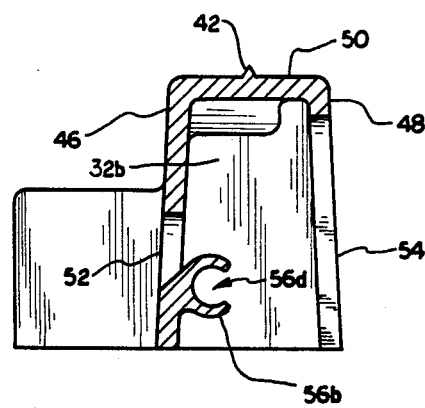
FIG. 5a shows only that part of the cross-section shown in FIG. 5 which corresponds to the lower clamping ring.

Outer edge 46 has cut therein a window 52 (see FIG. 5a) which is associated with locking mechanism 26. It should be appreciated that outer edge 46 has cut therein another window (not shown) which is associated with locking mechanism 28. In particular, the windows in outer edge 46 allow for the appearance of release tabs 26e, 28e on the outside of cover 12. The height of the outer edge window 52 is such that release tab 26e is constrained from moving in the clockwise direction to thereby constrain stiff leg member 26a to be essentially horizontal prior to the placing of cover 12 over closure 10.

The inner edge 48 of lower ring 32b also has cut therein a window 54 which is also associated with locking mechanism 26. As with the window in the outer edge, it should be appreciated that inner edge 48 also has cut therein another window (not shown) which is associated with locking mechanism 28. In particular, the windows in the inner edge 48 allow for the appearance of stiff leg members 26a, 28a on the inside of cover 12.

Lower ring 32b further includes on the lower portion of its inner edge 48, three C-shaped receptacles 56a, b, c which act as the receiver for pivot pin 26c. The mouth 56d of receptacle 56 opens towards the inside of cover 12. As with windows 52, 54 in the outer and inner edges 46, 48, respectively, the lower portion of inner edge 48 also includes three other C shaped receptacles (not shown) which act as the receiver for pivot pin 28c of locking mechanism 28. It should be understood that other means may be used to attach the pivot pin to the ring assembly.

As described above the release tabs 26e, 28e of locking mechanisms 26, 28 project through their associated windows in the outer edge 46 of lower ring 32b. Cover 12 may then be removed from closure 10 simply by pressing downward on tabs 26e, 28e. Floodwaters, however, may carry debis such as floating pieces of wood into the vicinity of the cover. It is therefore desirable that such debris does not accidentally contact the release tabs in a manner such that the stiff leg members are released. In order to prevent such an occurrence I have provided lower ring 32b with protective ears 58a, b on its outer edge 46. The ears are positioned on that edge such that they are on either side of window 52. Therefore ears 58a,b protect against the accidental release of locking mechanism 26. Lower ring 32b also includes another set of protective ears (not shown) which are associated with the window cut therein for release tab 28e. Those ears protect against accidental release of locking mechanism 28. A locking means such as a tamper resistant cross-pin or seal can also be used to prevent unauthorized manipulation of the release tabs, which could affect the quality of protection of the flood cover assembly.

It is to be understood that the description of the preferred embodiment is intended to be only illustrative, rather than exhaustive of the present invention. Those of ordinary skill will be able to make certain additions, deletions, and/or modifications to the embodiment of the disclosed subject matter without departing from the spirit of the invention or its scope, as defined by the appended claims.

What is claimed is:

1. A locking system for use in a flood cover having a rigid mouth, said cover adapted for placement over a vertically standing equipment closure having an outside surface, said locking system including at least two lock mechanisms, each of said mechanisms comprising:
   (a) a surface contacting means;
   (b) a stiff leg means having one end connected to said surface contacting means in a manner such that said contacting means projects upwardly therefrom at an angle, the length of said stiff leg means being greater than the air space which would result between said equipment closure outside surface and said flood cover if said cover should be placed over said closure such that said closure is centered in said rigid mouth;
   (c) pivot means, the other end of said stiff leg means being connected to said pivot means; and
   (d) spring means connected to said stiff leg means in a manner such that said spring means holds said stiff leg means essentially parallel to the opening of said rigid mouth prior to the placement of said cover over said closure, the tension of said spring means increasing as said cover is placed over said equipment closure and said surface contacting means contacts said closure outside surface to thereby cause said stiff leg means to pivot on said pivot means.

2. The locking system of claim 1 wherein each of said locking mechanisms further comprises a release means having one end connected to said stiff leg means through said pivot means.

3. The locking system of claim 2 wherein the other end of said release means is accessible from the outside of said flood cover.

4. The locking system of claim 1 wherein each of said locking mechanisms further comprises a release means connected to said stiff leg means through said pivot means in a manner such that a downward force on said release means causes said stiff leg means to rotate in a direction such that said stiff leg means is no longer essentially parallel to said rigid mouth opening, said force increasing the load on said spring means.

5. The locking system of claim 1 wherein said surface contacting means comprises a pressing means connected to said stiff leg means and a surface engagement means mounted on said pressing means.

6. The locking system of claim 5 wherein said surface engagement means is a friction pad.

7. A locking system for use in a flood cover having a rigid mouth, said cover adapted for placement over a vertically standing equipment closure having an outside surface, said locking system including at least two locking mechanisms, each of said mechanisms comprising:
   (a) a surface contacting means;
   (b) a stiff leg means having one end connected to said surface contacting means in a manner such that said contacting means projects upwardly therefrom at an angle, the length of said stiff leg means being greater than the air space which would result between said equipment closure outside surface and said flood cover if said cover should be placed over said closure such that said closure is centered in said rigid mouth;
   (c) pivot means, the other end of said stiff leg means being connected to said pivot means;
   (d) a release means having one end connected to said stiff leg means through said pivot means; and
   (e) spring means connected to said stiff leg means in a manner such that said spring means holds said stiff leg means essentially parallel to the opening of said rigid mouth prior to the placement of said cover over said closure, the tension of said spring means increasing as said cover is placed over said equipment closure and said surface contacting means contacts said closure outside surface to thereby cause said stiff leg means to pivot on said pivot means.

8. The locking system of claim 7 wherein said release means is connected to said stiff leg means in a manner such that a downward force on said release means causes said stiff leg means to rotate in a direction such that said stiff leg means is no longer essentially parallel to said rigid mouth opening, said force increasing the load on said spring means.

9. A flood cover adapted for placement over a vertically standing equipment closure having an outside surface comprising:
   (a) a rigid mouth;
   (b) at least first and second locking mechanisms each mounted in said rigid mouth such that said locking mechanisms are substantially opposed to each other; each of said locking mechanisms comprising:
      (i) a surface contacting means;
      (ii) a stiff leg means having one end connected to said surface contacting means in a manner such that said contacting means projects upwardly therefrom at an angle, the length of said stiff leg means being greater than the air space which would result between said equipment closure outside surface and said flood cover if such cover should be placed over said closure such that said closure is centered in said rigid mouth;
      (iii) pivot means fixably mounted to said rigid mouth, the other end of said stiff leg means being connected to said pivot means such that said stiff leg means projects inside said cover; and
      (iv) spring means connected to said stiff leg means in a manner such that said spring means holds said stiff leg means essentially parallel to the opening of said rigid mouth prior to the placement of said cover over said closure, the tension of said spring means increasing as said cover is placed over said equipment closure and said surface contacting means contacts said closure outside surface to thereby cause said stiff leg means to pivot on said pivot means.

10. The flood cover of claim 9 wherein said spring means is in unitary relationship with said stiff leg means.

11. The flood cover of claim 10 wherein said rigid mouth includes means to constrain said spring means from pivoting when said surface contacting means contacts said closure outside surface.

12. The flood cover of claim 9 wherein each of said locking mechanisms further comprises a release means having one end connected to said stiff leg means through said pivot means.

13. The flood cover of claim 12 wherein the other end of said release means is accessible from the outside of said flood cover.

14. The flood cover of claim 9 wherein each of said locking mechanisms further comprises a release means connected to said stiff leg means through said pivot means in a manner such that a downward force on said release means causes said stiff leg means to rotate in a direction such that said stiff leg means is no longer essentially parallel to said rigid mouth opening, said force increasing the load on said spring means.

* * * * *